United States Patent [19]

Nakano

[11] Patent Number: 5,254,056
[45] Date of Patent: Oct. 19, 1993

[54] TOROIDAL TYPE CONTINUOUSLY VARIABLE TRANSMISSION

[75] Inventor: Masaki Nakano, Kanagawa, Japan

[73] Assignee: Nissan Motor Co., Ltd., Yokohama, Japan

[21] Appl. No.: 922,489

[22] Filed: Jul. 31, 1992

[30] Foreign Application Priority Data

Aug. 1, 1991 [JP] Japan ................... 3-214258

[51] Int. Cl.⁵ ............................................ F16H 15/08
[52] U.S. Cl. ....................................... 476/10; 476/42; 475/185
[58] Field of Search ............... 74/190.5, 200; 475/185, 475/216; 476/10, 40

[56] References Cited

U.S. PATENT DOCUMENTS

| | | | |
|---|---|---|---|
| 3,620,101 | 11/1971 | Abbott et al. | 475/216 X |
| 5,067,360 | 11/1991 | Nakano | 475/185 X |
| 5,136,891 | 8/1992 | Nakano | 74/200 X |

FOREIGN PATENT DOCUMENTS

| | | |
|---|---|---|
| 63-92859 | 6/1988 | Japan . |
| 1-112076 | 4/1989 | Japan . |
| 1-206150 | 8/1989 | Japan . |
| 1-216158 | 8/1989 | Japan . |
| 2-163553 | 6/1990 | Japan . |
| 2-163562 | 6/1990 | Japan .................... 475/216 |
| 2180307 | 3/1987 | United Kingdom ............ 475/216 |

Primary Examiner—Allan D. Herrmann
Assistant Examiner—David W. Laub
Attorney, Agent, or Firm—Foley & Lardner

[57] ABSTRACT

A toroidal type continuously variable transmission which is arranged such that a pair of toroidal transmission mechanisms are disposed around an input shaft connected to an engine. A forward-reverse switching device is located around the first shaft between the engine and the toroidal transmission mechanism. A control valve assembly is disposed around the forward-reverse switching device relative to the input shaft. Therefore, the needed space for the transmission is reduced, and the responsibility of controlled hydraulic pressure to each element is improved.

9 Claims, 3 Drawing Sheets

TOROIDAL TYPE CONTINUOUSLY VARIABLE TRANSMISSION

BACKGROUND OF THE INVENTION

1. Field of the Invention

The present invention relates to improvements in a toroidal type continuously variable transmission (CVT), and more particularly to a toroidal transmission having two toroidal cavities around a common axis (often called a dual cavity type).

2. Description of the Prior Art

Hitherto, a variety of toroidal cavity type continuously variable transmission have been proposed. A typical toroidal cavity type continuously variable transmission is disclosed, for example, in Japanese Patent Provisional Publication Nos. 1-206150 and 1-216158, in which a pair of toroidal type continuously variable transmission (CVT) mechanisms are used and a forward-reverse switching device is disposed apart from an engine so as to sandwich the CVT mechanisms with the engine. In particular, Japanese Patent Provisional Publication No. 1-216158 discloses a toroidal type continuously variable transmission (CVT) in which an input shaft is connected to a torque converter and an output shaft is connected to a forward-reverse switching device.

Accordingly, with such a conventional arrangement, when a control valve assembly is disposed around the forward-reverse switching device, the responsibility of the hydraulic pressure from a control valve assembly is degraded due to the extension of oil passages. On the other hand, when the control valve assembly is disposed around the CVT in order to avoid a degradation of the responsibility of the hydraulic pressure, it is difficult to ensure a space for the control valve assembly around the CVT.

SUMMARY OF THE INVENTION

It is an object of the present invention to provide an improved toroidal type CVT which performs a high reliability in hydraulic control due to the shortening of oil passages from a control valve assembly to the forward-reverse switching device and the CVT mechanisms.

According to the present invention, a toroidal type continuously variable transmission is drivingly connected to an engine through a torque converter or fluid coupling and comprises a first shaft which is the torque converter or fluid coupling so as to receive engine power. A second shaft is disposed to be parallel with the first shaft. A toroidal transmission mechanism is disposed around the first shaft and connected to the second shaft. A forward-reverse switching mechanism is disposed around the first shaft between the torque converter and the toroidal transmission mechanism. A torque transmission mechanism connects the first and second shafts. A control valve assembly is disposed around said forward-reverse switching mechanism relative to said first shaft.

With this arrangement, the length of oil passages from the control valve assembly to the forward-reverse switching device and the toroidal continuously variable transmission. Therefore, the responsibility of hydraulic pressure is largely improved. This improves the reliability for controlling the components.

DETAILED DESCRIPTION OF THE INVENTION

Referring now to FIGS. 1 to 4, there is shown a preferred embodiment of a toroidal type continuously variable transmission (CVT) 10 according to the present invention.

Figure 2:
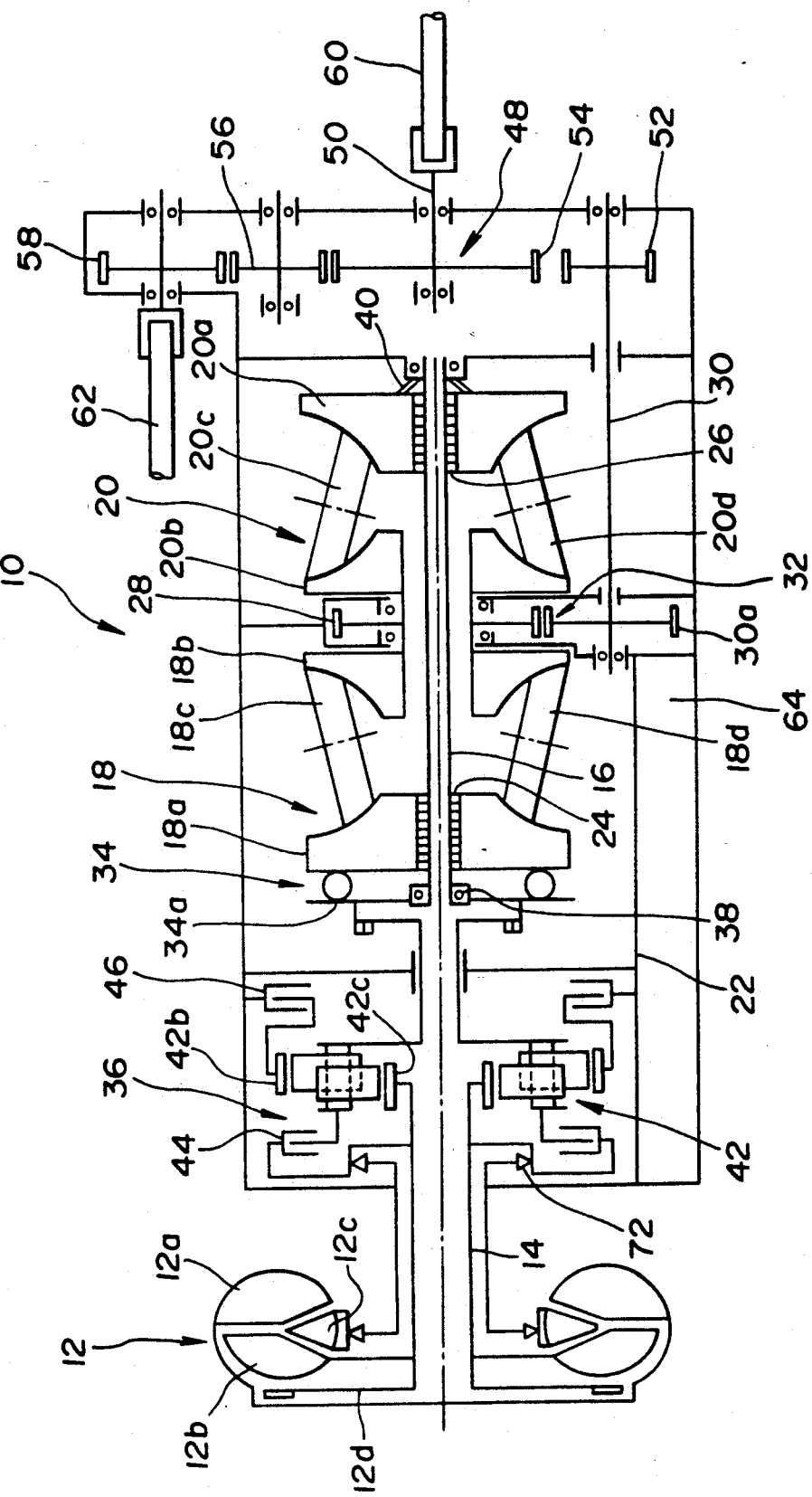
FIG. 2 is a schematic diagram of the toroidal continuously variable transmission of FIG. 1.

As shown in FIG. 2, the CVT 10 is drivingly connected to a torque converter (or fluid coupling) 12 so as to receive rotating energy from an engine (though not shown) through the torque converter 12. The torque converter 12 is of a conventional type and provided with a pump impeller 12a, a turbine runner 12b, stator 12c and a lock-up clutch 12d. An input shaft 14 is arranged to penetrate a central portion of the torque converter 12. A forward-reverse switching device 36 is connected to an output end of the input shaft 14 (a right hand side portion as viewed in FIG. 2). The forward-reverse switching device 36 is provided with a planetary gear set 42, a forward clutch 44 and a reverse brake 46.

The input shaft 14 is supported to a first shaft (a torque transmission shaft) 16 which is coaxially arranged with the input shaft 14. First and second toroidal transmission mechanisms 18 and 20 are disposed tandem (side by side) around the first shaft 16. The first toroidal transmission mechanism 18 is provided with a first input disc 18a and a first output disc 18b each of which has a toroidal curved surface (cavity). The toroidal curved surfaces are arranged to be opposite to each other. A pair of power rollers 18c and 18d are oppositely disposed around the first shaft 16 and in frictional contact with the toroidal surfaces of the first input and output discs 18a and 18b. The power rollers 18c and 18d are inclinably supported to supporting mechanisms (not shown), respectively. The first toroidal transmission mechanism 18 further provides a hydraulic actuator (no numeral) and a pair of servo piston 18e and 18f, though not shown in FIG. 2.

Similarly, the second toroidal transmission mechanism 20 is provided with a second input disc 20a and a second output disc 20b each of which has a toroidal curved surface. The toroidal curved surfaces are arranged to be opposite to each other. A pair of power rollers 20c and 20d are oppositely disposed around the first shaft 16 and in frictional contact with the toroidal surfaces of the second input and output discs 20a and 20b. The power rollers 20c and 20d are inclinably supported to supporting mechanisms (not shown), respectively. The second toroidal transmission mechanism 20 further provides a hydraulic actuator (no numeral) and a pair of servo pistons 20e and 20f, though not shown in FIG. 2.

The first and second toroidal mechanisms 18 and 20 are arranged around the first shaft 16 so that the first and second output discs 18b and 20b are oppositely disposed with each other at their backs. The first input disc 18a is arranged to be pushed toward a right-hand side as viewed in FIG. 2 by a loading cam 34 which generates a pushing force according to the input torque from the torque converter 12. The second input disc 20a of the second toroidal transmission mechanism 20 is arranged to be pushed toward a left-hand side as viewed in FIG. 2 by a disc spring 40. Each of the power rollers 18c, 18d, 20c and 20d are controlled by each of the servo pistons 18e, 18f, 20e and 20f which is respectively operated upon receiving control pressure from a control valve assembly 64, so that each power roller (18c, 18d, 20c, 20d) is set at a desired angle in accordance with a driving condition of a vehicle. Such a control method is disclosed in Japanese Utility Model Provisional Publication No. 63-92859. With this control of the angle of each power roller, the input torque of the first and second input discs 18a and 20a is transmitted to the output discs 18b and 20b while being continuously varied.

The first and second output discs 18b and 20b are splined to an output gear 28 which is relatively rotatable with the first shaft 16. The torque force transmitted to the first and second output discs 18b and 20b is further transmitted to a second shaft (counter shaft) 30 connected to a gear 30a through the output gear 28. Thus, the output gear 28 and the gear 30a, constitute a torque transmitting mechanism 32.

A torque transmitting structure connected to the second shaft 30 is determined in accordance with an applied driving system. For example, when the CVT 10 is applied to a four wheel driving system, the structure connected to the second shaft 30 is arranged as shown in FIG. 2. Thus, a gear 52 connected to the second shaft 30 and a gear 54 connected to an output shaft 50 are engaged with an idler gear 56. Such a construction makes a torque transmitting mechanism 48. The output shaft 50 is interconnected to a first propeller shaft 60. The idler gear 56 is engaged with a distributor gear 58 which is interconnected to a second propeller shaft 62. Such a distributing structure is disclosed in Japanese Patent Provisional Publication No. 2-163553.

Figure 1:
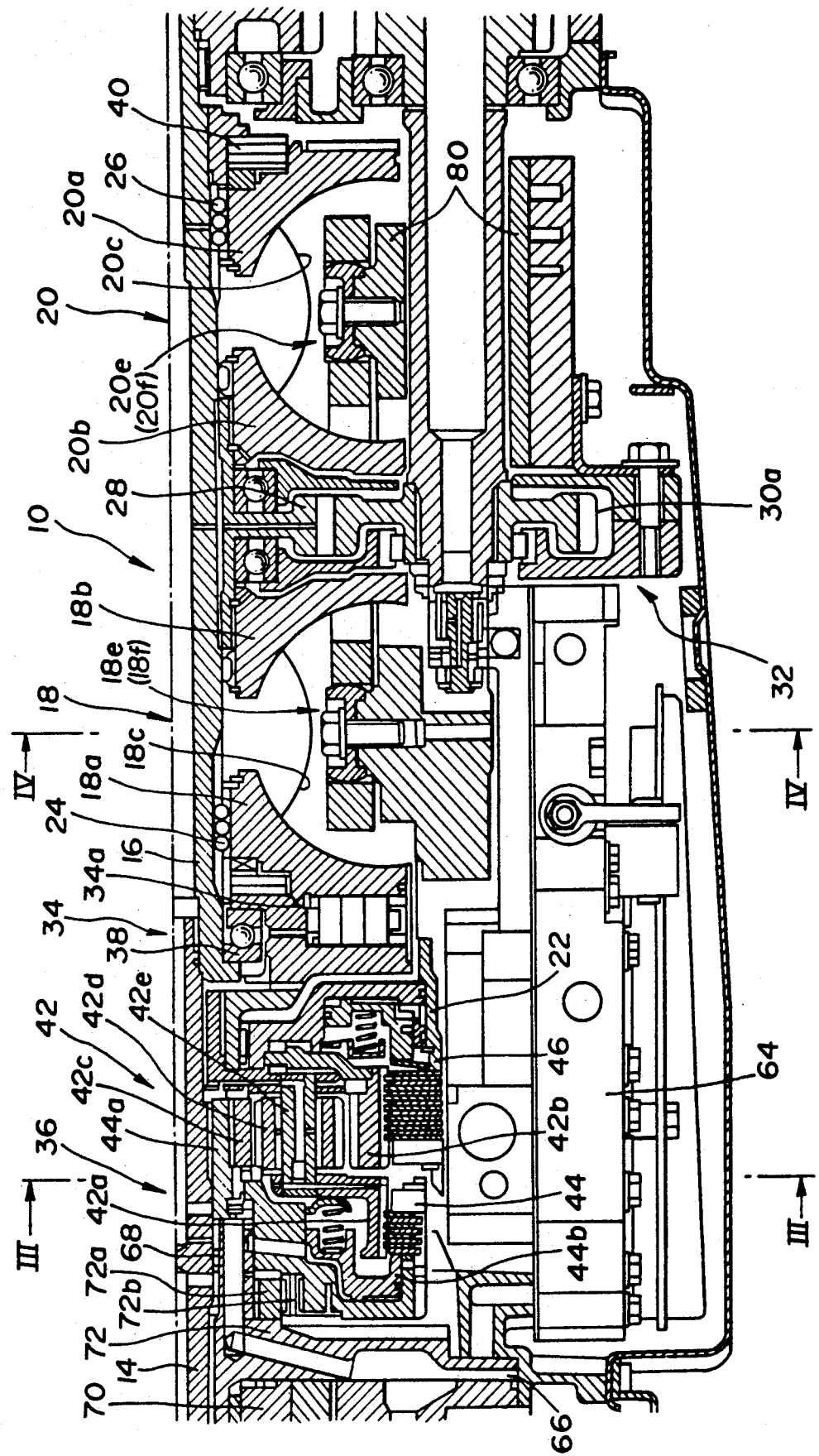
FIG. 1 is a partial cross-sectional view showing a lower half portion of an embodiment of a toroidal continuously variable transmission according to the present invention.

Referring to FIG. 1, the forward-reverse switching device 36 will be discussed in detail hereinafter.

As shown in FIG. 1, the forward-reverse switching device 36 is provided with the planetary gear set 42 and a forward clutch 44. The forward clutch 44 is engageable to anchor a carrier 42a of the planetary gear set 42 to the input shaft 14. A reverse brake 46 is engageable to anchor a ring gear 42b of the planetary gear 42 to a casing 22. A sun gear 42c of the planetary gear 42 is splined to an outer periphery of a clutch drum 44a which is splined to the input shaft 14. Planet pinions 42d and 42e are engaged with each other to form a double planet pinion structure. A normal rotating force directing in the same direction as the rotating force from the engine is inputted from the forward-reverse switching device 36 to the toroidal CVT 10 by means of the engagement of the forward clutch 44 and the disengagement of the reverse brake 46. Further, a reverse rotating force which is reverse in direction with a rotating force from the engine is inputted from the forward-reverse switching device 36 to the toroidal CVT 10 by means of the disengagement of the forward clutch 44 and the engagement of the reverse brake 46.

An oil pump cover 66 located around the input shaft 14 is splined at its left end portion in FIG. 1 (through not shown) to the torque converter 12 and supported at its right end portion as viewed in FIG. 1 to the input shaft 14 through a bush 68. The oil pump cover 66 is engaged with an oil pump 70 and splined to an inner-race 72a of the one-way clutch 72 of the hill-hold type. A roller 72b of the one-way clutch 72 is splined to an inner periphery of an clutch drum 44a which is splined to the inner peripheral and a right end portion as viewed in FIG. 1 of the oil pump cover 66. The one-way clutch 72 is engageable to limit the rotation of the input shaft 14 relative to the casing 22 so as to allow in only one direction. Accordingly, when the normal rotating force is inputted to the toroidal type CVT 10, the reverse rotation is never applied even if it is applied to the toroidal type CVT 10. Therefore, it is prevented that an automotive vehicle is backwardly moved on a sloping road. Thus, this arrangement improves a backwardly moving problem which is caused by an automotive vehicle provided with a belt type CVT as disclosed in Japanese Patent Provisional Publication No. 1-112076.

Furthermore, the forward clutch 44 is provided with the clutch drum 44a and the piston 44b with which the one-way clutch 72 having a hill-hold function is coaxially arranged. Since the one-way clutch 72 is disposed at an inner peripheral portion of the clutch drum 44a so as to be coaxial with the piston 44b, the CVT 10 is made without increasing the axial length.

The loading cam 34a of the loading cam device 34 is engaged with the first shaft 16 so as to be relatively rotatable. The loading cam 34a is supported to the first shaft 16 through a thrust bearing 38. The first and second input dics 18a and 20a are supported through ball splines 24 and 26, respectively, so as to be rotatable and smoothly axially slidable. Accordingly, when the axially pushing force generated by the loading cam device 34 is applied to the first input disc 18a, the reverse directional force of the axially pushing force is applied to the second input disc 20a through a disc spring 40. Also, when the reverse directional force of the axially pushing force is applied to the second input disc 20a through the disc spring 40, the axially pushing force is applied to the first input disc 18a. Therefore, the first and second input discs 18a and 20a reversely slides along the first shaft 16 so that their sliding amounts along the first shaft 16 are the same to each other.

The control valve assembly 64 is disposed around the outer peripheral portion of the forward-reverse switching device 36 and supplies a control pressure to the forward clutch 44, the reverse brake 46 and the power rollers 18c, 18d, 20c and 20d.

Figure 3:
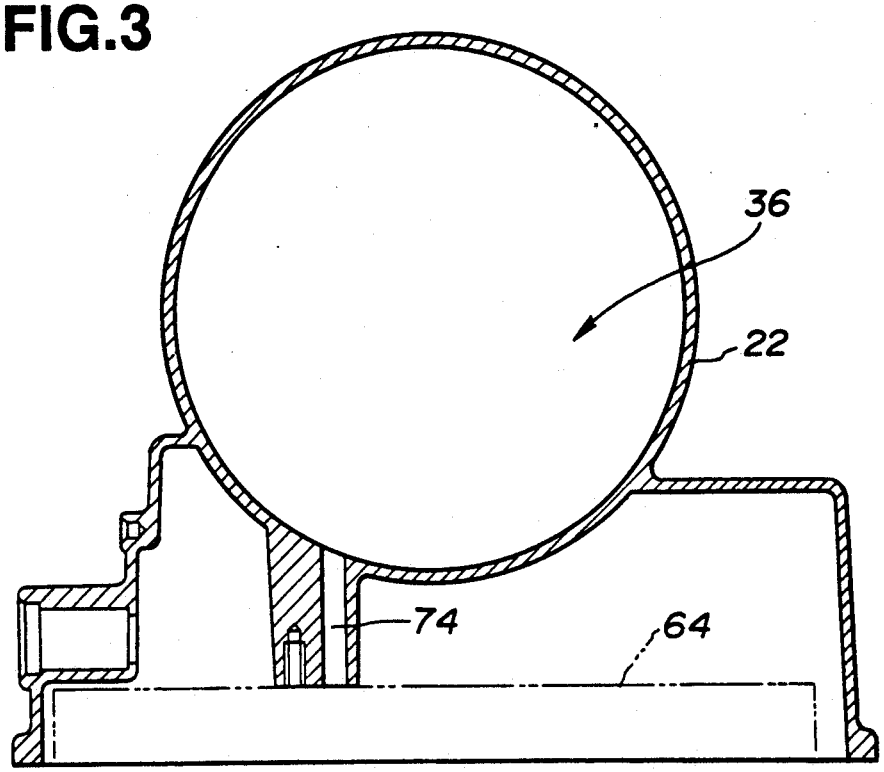
FIG. 3 is a cross-sectional view of a casing taken in the direction of arrows substantially along the line IV—IV embodiment of FIG. 1.

As shown in FIG. 3, a receiving portion of the casing 22 for the forward-reverse switching device 36 is formed in a cylindrical shape in cross-section perpendicular to the central axis of the CVT 10. The forward-reverse switching device 36 is disposed at a portion defined by the cylindrical wall of the casing 22, as is similar to a toroidal type CVT disclosed in Japanese Patent Provisional Publication No. 2-163553. The control valve assembly 64 is disposed at an outside portion of the cylindrical wall (practically under the cylindrical wall).

With this arrangement, it is realized that the control valve assembly 64 is disposed around the forward-reverse switching device 36 and under the toroidal transmission mechanism 18, 20. Accordingly, the oil pump 70, the torque converter 12, the forward clutch 44, the reverse brake 46 and the servo pistons 18e, 18f, 20e and 20f can be located near the control valve assembly 64 so as to shorten the length of oil passages thereof. This improves the reliability of controlling the components.

Figure 4:
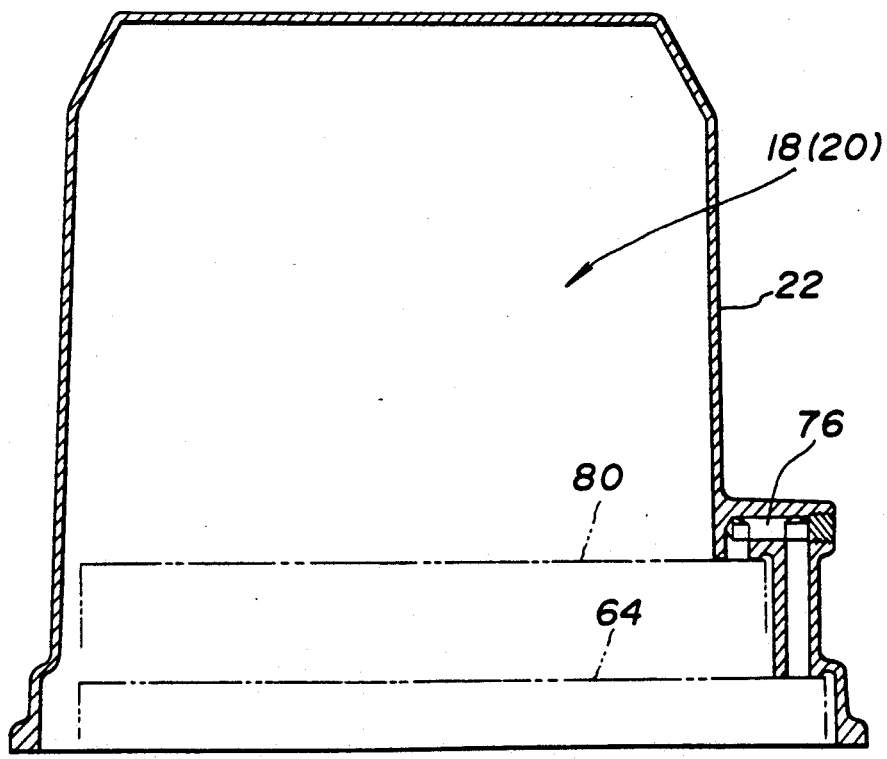
FIG. 4 is another cross-sectional view of the casing of FIG. 1.

As shown in FIG. 3, an oil passage 74 from the control valve assembly 64 to the reverse brake 46 is disposed at the outside portion of the cylindrical wall of the casing 22. Similarly, an oil passage (no numeral) from the control valve assembly 64 to the forward clutch 44 is disposed at the outside portion of the cylindrical wall of the casing 22. An oil passage 76 from the control valve assembly 64 to the servo pistons 18e and 18f of the toroidal transmission mechanism 18 is disposed at an inside portion of a rectangular shaped wall of the casing 22, as shown in FIG. 4. The controlled hydraulic pressure is fed to the servo pistons 18e and 18f through the oil passage 76 and a servo piston body 80 of a laminated structure. An oil passage (though not shown) from the control valve assembly 64 to the servo-pistons 20f and 20f is disposed at the inside portion of the rectangular wall of the casing 22 so as to be parallel with the axis of the CVT 10.

Accordingly, it becomes possible that the length of oil passages to the forward clutch 44, the reverse brake 46 and each servo-piston is shortened, and therefore the control of hydraulic pressure being supplied is largely improved.

What is claimed is:

1. A toroidal type continuously variable transmission which is drivingly connected to a torque converter or fluid coupling, said toroidal type continuously variable transmission comprising:
    an input shaft connected to the torque converter or fluid coupling;
    a first shaft disposed to be coaxial with said input shaft;
    a second shaft disposed to be parallel with said first shaft;
    first and second toroidal transmission mechanisms disposed tandem on said first shaft;
    a forward-reverse switching device connected to said input shaft and disposed between said torque converter or fluid coupling and said first toroidal transmission mechanism and operatively connected to said first and second toroidal transmission mechanisms;
    a torque transmission mechanism disposed between said first and second toroidal transmission mechanisms and connected to said first and second toroidal transmission mechanisms and said second shaft; and
    a control valve assembly disposed at a space surrounded by said forward-reverse switching device, said first toroidal transmission mechanism and said torque transmission mechanism.

2. A toroidal type continuously variable transmission as claimed in claim 1, further comprising a casing in which said first and second shafts are disposed, said casing having a first cross-section perpendicular to an axis of said first shaft and located at a first position where said forward-reverse switching device is disposed, and which is formed in a generally cylindrical shape; and or second cross-section perpendicular to the axis of said first shaft and located at a second position wherein at least one of said first and second toroidal transmission mechanisms are disposed, and which is formed in a generally rectangular shape.

3. A toroidal type continuously variable transmission as claimed in claim 2, wherein hydraulic pressure from said control valve assembly is fed to said forward-reverse switching device through a first passage formed outside of the cylindrical shape of said casing and fed to at least one of said first and second toroidal transmission mechanisms through a second passage formed inside of the rectangular shape of said casing.

4. A torodial type continuously variable transmission as claimed in claim 2, wherein said first cross-section is smaller than said second cross-section.

5. A toroidal type continuously variable transmission as claimed in claim 1, wherein said control valve assembly is disposed proximate the torque converter or fluid coupling.

6. A toroidal type continuously variable transmission as claimed in claim 5, wherein said control valve assembly is disposed under said forward-reverse switching device and said first toroidal transmission mechanism.

7. A toroidal type continuously variable transmission as claimed in claim 1, further comprising a loading cam device which is supported by said first shaft and which applies an axial pushing force to said first and second toroidal transmission mechanisms.

8. A toroidal type continuously variable transmission connected to a torque converter or fluid coupling, said toroidal type continuously variable transmission comprising:
    an input shaft connected to the torque converter or fluid coupling;
    a torque transmission shaft disposed coaxial with said input shaft;
    a counter shaft disposed parallel with said torque transmission shaft;
    first and second toroidal transmission mechanisms disposed in tandem on said torque transmission shaft;
    a forward-reverse switching device connected to said input shaft and disposed between the torque converter or fluid coupling and said first toroidal transmission mechanism and in operative communication with said first and second toroidal transmission mechanisms;
    a torque transmission mechanism connecting said first and second toroidal transmission mechanisms and said counter shaft;
    a control valve assembly disposed at a space surrounded by said forward-reverse switching device, said first toroidal transmission mechanism and said torque transmission mechanism;
    a first passage line through which hydraulic communication between said control valve assembly and at least one of said first and second toroidal transmission mechanisms occurs; and
    a second passage line through which hydraulic communication between said control valve assembly and said forward-reverse switching device occurs.

9. A toroidal type continuously variable transmission as claimed in claim 4, further comprising an oil pump disposed such that said forward-reverse switching device is sandwiched between said toroidal transmission mechanism and said oil pump, said oil pump being in communication with said control valve assembly.

* * * * *